J. G. HARTMAN.
VEHICLE WHEEL.
APPLICATION FILED MAR. 8, 1919.

1,381,828.

Patented June 14, 1921.

3 SHEETS—SHEET 1.

Inventor
Jacob G. Hartman
Attys

J. G. HARTMAN.
VEHICLE WHEEL.
APPLICATION FILED MAR. 8, 1919.

1,381,828.

Patented June 14, 1921.
3 SHEETS—SHEET 2.

Inventor
Jacob G. Hartman

Attys

J. G. HARTMAN.
VEHICLE WHEEL.
APPLICATION FILED MAR. 8, 1919.

1,381,828.

Patented June 14, 1921.

3 SHEETS—SHEET 3.

Inventor
Jacob G. Hartman
Attys

UNITED STATES PATENT OFFICE.

JACOB G. HARTMAN, OF BALTIMORE, MARYLAND.

VEHICLE-WHEEL.

1,381,828. Specification of Letters Patent. Patented June 14, 1921.

Application filed March 8, 1919. Serial No. 281,470.

*To all whom it may concern:*

Be it known that I, JACOB G. HARTMAN, of Baltimore, in the county of Baltimore City and State of Maryland, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels, and especially to such as employ a shock absorbing means between inner and outer rims, and the object of my invention is to provide a simple and highly efficient wheel of this type which will afford a maximum of resiliency to load pressure, it being a further object of my invention to so construct the elements forming the shock absorbing means as to permit of ready application to standard wheels.

Figure 1:
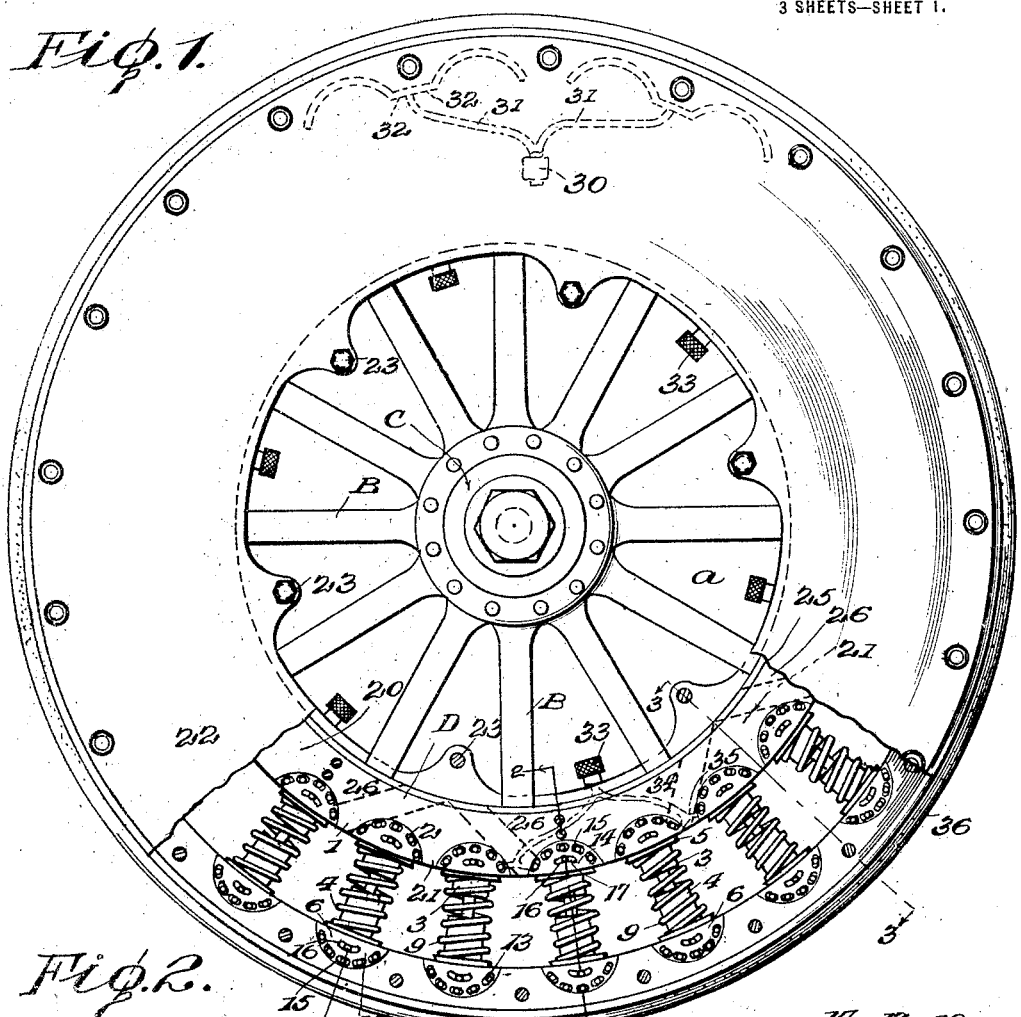
Figure 2:
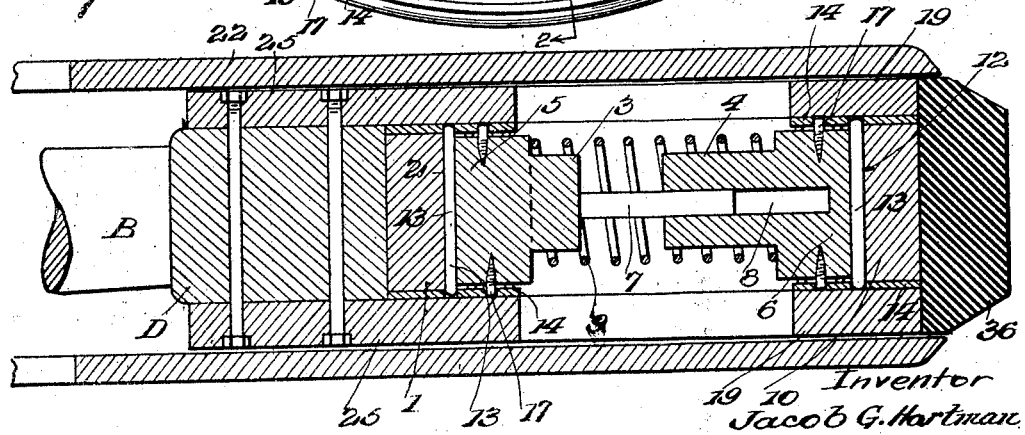
Figure 3:
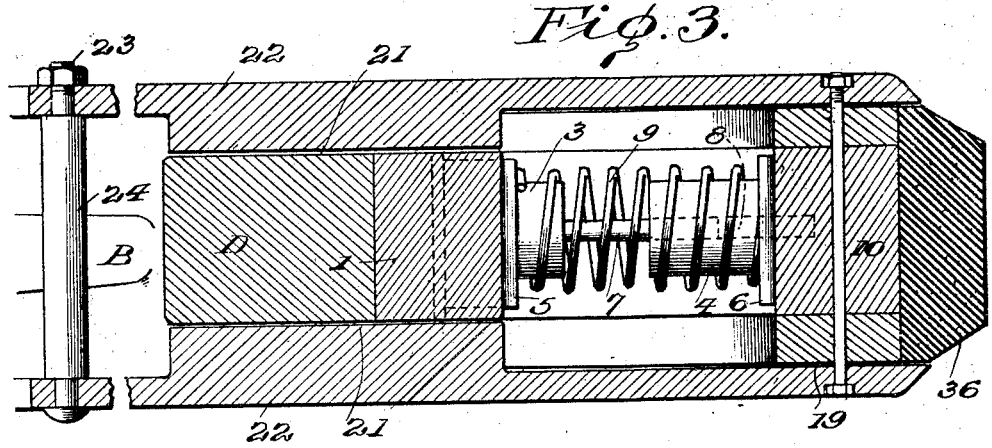
Figure 4:
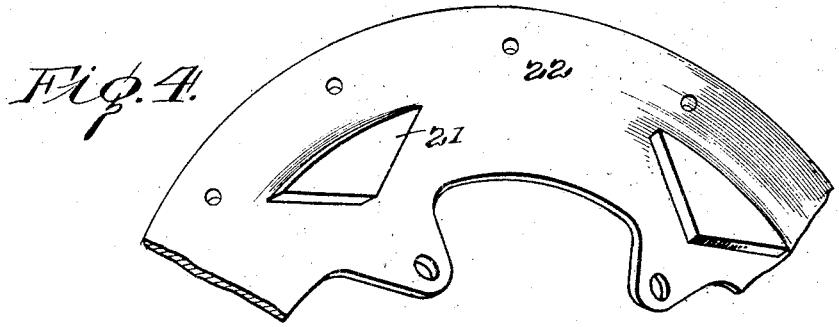
Figure 5:
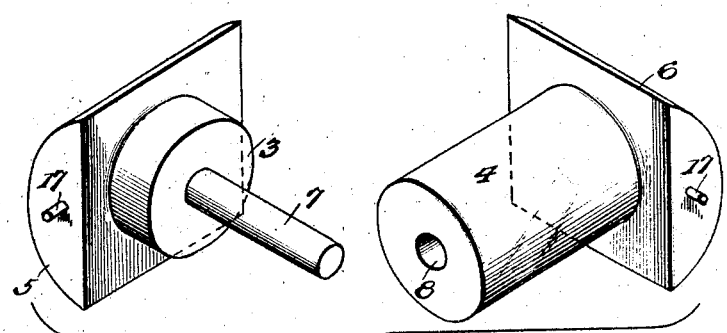
Figure 7:
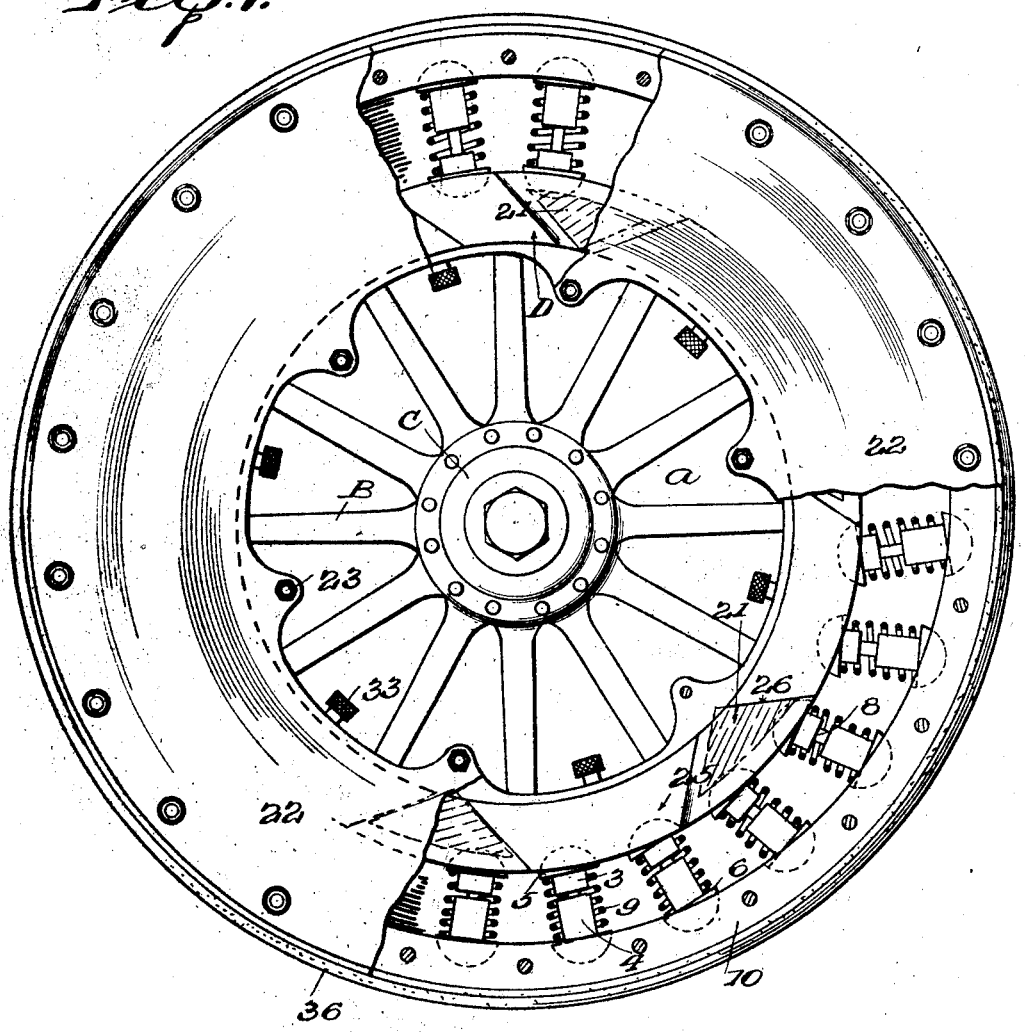
Figure 6:
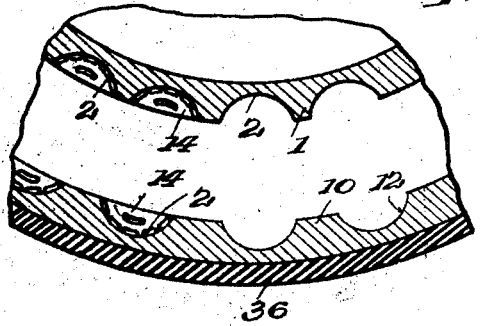

In the drawings, Figure 1 is a view in side elevation of a wheel embodying my improvements, parts being broken away and others shown in section. Figs. 2 and 3 are sectional views on lines 2—2 and 3—3, respectively, Fig. 1. Fig. 4 is a perspective of a portion of one of the side plates. Fig. 5 is a detailed view of one of the spacing spokes. Fig. 6 is a sectional view showing the sides in the inner and outer rims for the spacing spokes. Fig. 7 is a side elevation of my improved wheel with parts broken away to show position of the rim members under compression.

Referring to the drawings, A designates the main body of the wheel having spokes B connecting the hub C and felly D. Encircling the felly D and snugly fitting the same is a rim 1, preferably of iron, which is of the same width as the felly to which it is secured. In the outer face of this rim is a series of concavities 2 each of which forms a seat for one end of a spacing spoke. These spacing spokes are preferably formed of two parts, 3 and 4, with convexed ends forming rockers 5 and 6, a reduced spindle-like portion 7 of the part 3 taking in a recess 8 of the part 4, and thus maintaining the two parts in proper alinement. A coiled spring 9, having its ends fitting about the parts 3 and 4 is effective to normally hold these two parts separated.

A second rim 10 of greater diameter than the rim 1 but of corresponding width is also provided with a series of concavities, indicated at 12, within which are seated the outer convexed rocker ends 6 of the spacing spokes. Each of the series of concavities 2, 12, is equipped with roller bearings 13, a pair of plates 14 on either side of the concavities and having elongated slots 15 arranged on an arc corresponding to the concavity of the rim, forming a sliding-way for each bearing. Beneath the arcual slots of these plates is a slot 16 which with studs 17 of the spacing spokes forms a non-pivotal connection between the latter and the rims 1 and 10, the slots being of sufficient length to permit of an extended rolling movement of the rocker ends of the spokes in their concaved seats. Lateral movement of the bearings in the outer rim is prevented by keepers in the form of rings 19 which are arranged on either side of the rim 10, the outer faces of these rings being flush with the sides of the wheel rim. The bearings in the concavities of the inner rim 1 are held in part by spacing blocks 20 and inwardly extending segment-shaped lugs 21 of plates 22 arranged on either side of the wheel extending from near the periphery of the rim 10 to a point slightly beyond the inner circumference of the felly D, these plates being secured together by bolts 23 and extending through sleeves 24 and arranged between alternate spokes B of the wheel.

Secured to the felly D on either side thereof and in spaced arrangement are a series of projections 25, the ends of which are beveled, as at 26. The lugs 21 extend between pairs of these projections and under load pressures engage the ends thereof to effect positive driving connection between the rims and the wheel, directly between the inner rim 1 and the felly D, and between the outer rim 10 and the felly through the instrumentality of the spacing blocks, the latter under such load pressures being forced together against the tension of their springs 9. Under pressure there is slack between the inner and outer rims 1 and 10, respectively, on each side of the vertical line of pressure and such slack is readily taken up by the spacing spokes. It will be noted that the spokes have no pivotal connection with the rims and that as they pass to and from the point of greatest compression are rocked in their seats in the two rims, the roller bearings affording a smooth movement between the rims and spacing spokes.

For the purpose of appropriately lubricating the roller bearings I may employ any desirable means, and in the drawings I have shown a reservoir 30 with channels 31 and branched outlets 32 for distributing lubricant to the bearings of the outer rim, while a similar arrangement with reservoir 33, channels 34 and branches outlets 35, is shown for the bearings of the inner rim.

It is manifest that any desired tread may be applied to the outer rim. I have shown a tire 36 of rubber which fits snugly between the outermost edges of the plates 22.

I claim as my invention:

1. A vehicle wheel including spaced apart inner and outer rims, each of said rims having a series of semi-cylindrical concaved seats on the face opposed to the other rim, expansible spacing spokes between said inner and outer rims, the ends of said spacing spokes being semi-cylindrical respectively seated within the concavities of said rims and having a freely movable guided engagement therewith, said spokes having no fixed pivotal connection with said rims in combination with a driving connection between said inner and outer rims.

2. In combination with a vehicle wheel, a cushioning means including an inner rim adapted to be secured to the periphery of the wheel and having a series of concaved semi-cylindrical seats on its outer face, an outer rim spaced from said inner rim and having a series of concaved semi-cylindrical seats on its inner face, two-part spacing spokes between said inner and outer rims, each part having a portion of semi-cylindrical form for fitting in the concavity of the rim next adjacent thereto, and with which it has a freely movable non-pivoted guided rolling contact, an element for maintaining the spoke parts in alinement, coiled springs normally holding said parts separated, and roller bearings between the rounded portions of said spacing spokes and the concavities of said rims.

3. In combination with a vehicle wheel, a cushioning means including an inner rim adapted to be secured to the periphery of the wheel and having a series of concaved seats on its outer face, an outer rim spaced from said inner rim and having a series of concaved seats on its inner face, two-part spacing spokes between said inner and outer rims, spring tension means normally maintaining the parts of said spacing spokes separated, the ends of said spacing spokes being respectively seated within the concavities of said rims, and a connection between said spoke ends and the respective rims including studs and plates having arcuate slots to receive said pins, such connection permitting rolling engagement between the spoke ends and the concavities of said rims without forming a pivot therebetween and also serving to retain the spokes in their respective seats.

In testimony whereof I have signed this specification.

JACOB G. HARTMAN.